US012654534B2

(12) United States Patent
Ukoko-Rongione

(10) Patent No.: US 12,654,534 B2
(45) Date of Patent: Jun. 16, 2026

(54) ELECTRIC VEHICLE

(71) Applicant: MCMURTRY AUTOMOTIVE LIMITED, Wotton-Under-Edge (GB)

(72) Inventor: Kevin Ukoko-Rongione, Wotton-under-Edge. (GB)

( * ) Notice: Subject to any disclaimer, the term of this patent is extended or adjusted under 35 U.S.C. 154(b) by 317 days.

(21) Appl. No.: 18/549,646

(22) PCT Filed: Mar. 9, 2022

(86) PCT No.: PCT/EP2022/055981
§ 371 (c)(1),
(2) Date: Sep. 8, 2023

(87) PCT Pub. No.: WO2022/189480
PCT Pub. Date: Sep. 15, 2022

(65) Prior Publication Data
US 2024/0174069 A1 May 30, 2024

(30) Foreign Application Priority Data
Mar. 11, 2021 (GB) ...................................... 2103356

(51) Int. Cl.
*B60K 1/04* (2019.01)
*B60L 50/60* (2019.01)
*B60L 58/10* (2019.01)
(52) U.S. Cl.
CPC ................ *B60K 1/04* (2013.01); *B60L 50/66* (2019.02); *B60L 58/10* (2019.02); *B60K 2001/0422* (2013.01); *B60K 2001/0438* (2013.01)
(58) Field of Classification Search
CPC .............. B60K 1/04; B60K 2001/0422; B60K 2001/0438; B60L 50/66; B60L 58/10

USPC ......................................................... 180/68.5
See application file for complete search history.

(56) References Cited

U.S. PATENT DOCUMENTS

| | | | |
|---|---|---|---|
| 8,973,691 B2 | 3/2015 | Morgan et al. | |
| 10,173,255 B2 * | 1/2019 | TenHouten | ............ B62D 25/04 |
| 10,668,816 B2 * | 6/2020 | Bucknell | .................. B62M 6/85 |
| 2006/0032683 A1 | 2/2006 | Kejha | |
| 2013/0075173 A1 * | 3/2013 | Kato | ................... H01M 50/242 |
| | | | 180/68.5 |

(Continued)

FOREIGN PATENT DOCUMENTS

| | | |
|---|---|---|
| CN | 206520664 U | 9/2017 |
| EP | 3323652 A1 | 5/2018 |
| WO | 2016135691 A1 | 9/2006 |

OTHER PUBLICATIONS

International Search Report for corresponding PCT/EP2022/055981 dated May 30, 2022.

(Continued)

*Primary Examiner* — Hau V Phan
(74) *Attorney, Agent, or Firm* — Egbert, McDaniel & Swartz, PLLC

(57) ABSTRACT

An electric vehicle has a cockpit containing a first seat and a battery having a housing. The housing has a first side portion, a second side portion and a connecting portion. A first side part of the battery is disposed in the first side portion. A second side part of the battery is disposed in the second side portion. An intermediate part of the battery is disposed in the connecting portion. A portion of a seating surface of the seat is lower than an uppermost surface of the battery.

24 Claims, 5 Drawing Sheets

(56) References Cited

U.S. PATENT DOCUMENTS

| | | | | |
|---|---|---|---|---|
| 2013/0078489 A1* | 3/2013 | Kato | ........................ | B60K 1/04 |
| | | | | 429/83 |
| 2023/0105559 A1* | 4/2023 | Wang | ..................... | B60L 53/62 |
| | | | | 180/68.5 |

OTHER PUBLICATIONS

Written Opinion of the International Searching Authority for corresponding PCT/EP2022/055981 dated May 30, 2022.
International Preliminary Report on Patentablity for corresponding PCT/EP2022/055981 dated Jul. 7, 2023.
Search Report for Priority Application 2103356.8, dated Jul. 28, 2021.
Examination Report for Priority Application 2103356.8, dated May 15, 2023.

* cited by examiner

ELECTRIC VEHICLE

FIELD OF THE INVENTION

The present invention relates to an electric vehicle comprising a battery which is arranged around a seat of the vehicle.

BACKGROUND

An electric vehicle is a vehicle that uses an electric motor for propulsion, with the electric motor being powered by one or more batteries in the vehicle. Some electric vehicles, known as hybrid electric vehicles, combine a conventional internal combustion engine with an electric motor. Typically, the batteries used for powering electric vehicles are rechargeable lithium-ion batteries, although other types of battery can also be used. In contrast to an internal combustion engine, operation of the electric motor in an electric vehicle does not produce any tailpipe emissions. Because of this, electric vehicles are promoted as a means for reducing greenhouse gas emissions caused by transportation. In particular, where renewable energy is used for recharging electric vehicle batteries, significant reductions in greenhouse gas emissions associated with transportation may be achieved.

In order for an electric vehicle to have a travel range that is comparable to an internal combustion engine vehicle, large capacity batteries must be integrated into the vehicle. Such large capacity batteries are typically bulky and relatively heavy, and so can be challenging to integrate into conventional vehicle designs. In a conventional electric vehicle, the battery is often located in the floor of the vehicle, such that it is located underneath the vehicle's seats. The battery may also often be located in front of, or behind, the vehicle's seats.

SUMMARY OF THE INVENTION

At its most general, the present invention provides an electric vehicle having a battery that extends around at least part of a seat of the vehicle. In particular, the battery is shaped to fit around the seat, such that it extends along opposing sides of the seat. For example, the battery may have a "U" shape, or a horseshoe shape, such that it fits around the seat. Fitting the battery around the seat in this manner may enable a size of the vehicle to be reduced, as well as improve a handling of the vehicle. The reduced dimensions of the vehicle may further contribute to an improved energy efficiency of the vehicle.

Indeed, by fitting the battery around the seat, both the battery and the seat may be located on the floor of the vehicle. This may contribute to reducing an overall height of the vehicle, as well as a height of a centre of mass of the vehicle, e.g. compared to a conventional electric vehicle where the battery is located underneath the seat. Reducing the height of the centre of mass may improve a handling and manoeuvrability of the vehicle, as well as reduce a risk of rollover (i.e. tipping over) of the vehicle. As a result, the vehicle's ability to safely go around bends and make turns at high speeds may be improved. This may, for example, improve the vehicle's ability to swerve in order to avoid a collision.

Additionally, fitting the battery around the seat may enable a length of the vehicle to be minimised. This is because, as the battery extends along sides of the seat, it need not take up as much space in front of, or behind, the seat. Thus, a moment of inertia in a longitudinal direction of the vehicle may be reduced. Arranging the battery around the seat may also contribute to locating the centre of mass of the vehicle centrally with respect to a length of the vehicle. Such a reduced length and longitudinal moment of inertia of the vehicle, as well as a more centrally located centre of mass, may result in an improved handling and manoeuvrability of the vehicle.

According to a first aspect of the invention, there is provided an electric vehicle comprising: a cockpit containing a first seat, the first seat including a seating surface for receiving an occupant of the vehicle; and a battery comprising a first side part disposed on a first side of the first seat, a second side part disposed on a second, opposite side of the first seat, and an intermediate part located between the first side part and the second side part, each of the first side part, second side part and intermediate part comprising a plurality of battery cells; wherein at least part of the seating surface is lower than an uppermost surface of the battery.

Herein, an electric vehicle may refer to a vehicle comprising an electrically powered drive system. In particular, the electric vehicle may comprise an electric motor, and the battery may be arranged to power the electric motor. In some cases the electric vehicle may include multiple electric motors, e.g. a first electric motor for driving the front wheels and a second electric motor for driving the rear wheels. In such a case, the battery may be arranged to power the multiple electric motors. The electric vehicle may be a hybrid electric vehicle, e.g. it may comprise an internal combustion engine and an electric motor which are arranged to power the vehicle.

The electric vehicle of the invention may be a road vehicle, e.g. a road car. In other words, the vehicle may be designed to be driven on roads. Accordingly, the vehicle of the invention may include any safety features as required by safety regulations for road vehicles. For example, the vehicle may include headlights, taillights, indicator lights, mirrors, airbags and other safety features. The vehicle may have a seat-belt (e.g. a three-point seat-belt) for securing an occupant in the first seat.

The cockpit corresponds to a space defined within the vehicle in which the first seat is located. Additionally, various controls for the vehicle (e.g. steering wheel, accelerator pedal, brake pedal, dashboard, etc.) may be located in the cockpit. The cockpit may also be referred to as a driver compartment.

The cockpit may be defined within a body of the vehicle. The body of the vehicle may correspond to an outer structure or shell of the vehicle, which defines in part an outer surface of the vehicle. The body may be mounted to a chassis or frame of the vehicle, to which wheels of the vehicle are coupled. Alternatively, the vehicle may comprise a uni-body chassis or a monocoque chassis, in which case the body and the chassis may be formed as a single structure. The body may include sides, a roof, and a floor of the vehicle and serve to define the cockpit inside the vehicle. The body may include one or more doors for accessing the cockpit.

The first seat is arranged to receive an occupant (e.g. an adult human) of the vehicle. The first seat may be arranged as a driver seat, i.e. it may be arranged to receive a driver of the vehicle. Alternatively, the first seat may be arranged as a passenger seat, i.e. it may be arranged to receive a passenger of the vehicle. The first seat may be any suitable vehicle seat, e.g. a car seat.

The seating surface of the first seat may be a surface on which an occupant of the vehicle may seat themselves. The seating surface may be disposed on or over a base of the first seat. The seating surface may comprise a cushion, padding, and/or upholstery, so that the occupant may comfortably sit on the seating surface. The first seat may further comprise a seat back for receiving a back of an occupant seated on the seating surface, e.g. so that the occupant can rest their back against the seat back. The first seat may further comprise a headrest, against which the occupant may rest their head.

In some embodiments, the cockpit may contain a single seat, i.e. the first seat. In other words, the vehicle may be a single-seat vehicle, and so may be designed to only receive a single occupant (e.g. an adult human). The occupant may be a driver of the vehicle or, in the case of a self-driving vehicle, a passenger. Providing the vehicle with a single seat may enable dimensions of the vehicle (e.g. width, length) to be reduced. Providing the vehicle with a single seat may also serve to reduce a mass of the vehicle, and thus improve its overall energy efficiency. Moreover, surveys have shown that for a majority of car journeys, only a single seat is needed. Accordingly, inefficiencies linked to the transporting of unoccupied seats that occurs during a majority of car journeys may be avoided. The battery of the invention may be particularly beneficial for a single seat electric vehicle, as it may make use of available space located at the sides of the seat, whilst enabling an overall size of the vehicle to be reduced.

The battery, which may also be referred to as a traction battery, may be any suitable type of battery for powering an electric motor of the electric vehicle. The battery may be a rechargeable battery. Typically, the battery may be a lithium-ion battery, however other known types of battery may also be used. The battery includes at least three parts, namely the first side part, the second side part, and the intermediate part. Each of these parts comprises a respective plurality of battery cells, such that energy may be stored in each of the parts. The battery cells in each part may be arranged into one or more battery modules. Providing battery cells in each of the first side part, second side part and intermediate part may make efficient use of space available around the seat, in order to maximise an energy storage capacity of the battery.

The first side part of the battery is disposed on a first side of the first seat, whilst the second side part of the battery is disposed on a second, opposite side of the first seat. In other words, the first side part and second side part of the battery are disposed on opposite sides of the first seat. Thus, the first seat, may be located between the first side part and the second side part. For example, the first side part may be disposed on a left-hand side of the first seat, and the second side part may be disposed on a right-hand side of the first seat. The first side part of the battery may extend along at least part of the first side of the first seat, whilst the second side part of the battery may extend along at least part of the second side of the first seat. The right-hand side of the first seat and the left-hand side of the first seat may be defined with respect to an occupant of the first seat.

The intermediate part is located between the first side part and the second side part. For example, the intermediate part may be located in front of, and/or behind the first seat, as discussed in more detail below. The first side part, second side part and intermediate part may be connected together, e.g. they may be formed as a single unit which is mounted around the first seat. Alternatively, the first side part, second side part and intermediate part may be provided as individual units, each of which is mounted in a respective location around the first seat. Where the first side part is disposed on the left-hand side of the first seat and the second side part is disposed on the right-hand side of the first seat, the intermediate part may extend along at least part of a width of the first seat. In some cases, the intermediate part may extend along the width of the first seat.

The intermediate part may be electrically connected to the first side part and the second side part. In particular, battery cells in the intermediate part may be electrically connected to battery cells in the first side part and the second side part. Thus, the battery cells in each of the first side part, second side part and intermediate part may act as a single battery pack (or unit). For example, battery cells may be connected together in series or in parallel in battery modules, and the battery modules may be connected together in series or in parallel within in the first side part, the second side part, and the intermediate part. This may enable the battery to output suitable voltage and current levels for powering the electric motor. Suitable electrical connections may be provided between the first side part, second side part and intermediate part. For example, an electrical cable or other suitable electrical connector may be provided between the first side part and the intermediate part, and between the second side part and the intermediate part.

The first seat is arranged such that at least part of the seating surface is lower than an uppermost surface of the battery. In other words, a height of the uppermost surface of the battery above a ground surface on which the vehicle is disposed is greater than a height of the at least part of the seating surface above the ground surface. This may serve to minimise a height of the seating surface above the ground surface, in order to reduce a height of the vehicle as well as a height of the centre of mass of the vehicle. In particular, as the first side part and the second side part are disposed on the sides of the first seat, they can extend upwards without increasing a height of the seating surface. Thus, a height of the first side part and the second side part may be increased, in order to provide the battery with a desired energy storage capacity, without increasing the height of the seating surface. As a result, a large energy storage capacity may be provided, whilst maintaining a low vehicle height and centre of mass. Both the first seat and the battery may be mounted on a floor of the vehicle, in order to minimise their height above the ground surface. The battery may then extend upwards from the floor, such that its uppermost surface is located above at least part of the seating surface. The uppermost surface of the battery may correspond to a surface of the battery which is highest above a ground surface on which the vehicle is disposed. The uppermost surface of the battery may correspond to an upper surface of the battery.

In some cases, the floor (and/or under-surface) of the vehicle may be shaped to facilitate mounting the first seat lower in the vehicle compared to the battery, e.g. the floor of the vehicle may not be flat. Thus, a portion of the floor over which the first seat is mounted may be lower than a portion of the floor over which the battery is mounted. For example, the floor of the vehicle may include a cavity or recess in which the first seat is mounted.

The battery may be arranged such that no part of the battery is located underneath at least part of the seating surface. This may enable a height of the first seat in the vehicle to be minimised, as the first seat may be directly mounted to a floor of the vehicle or cockpit. For example, the seating surface may include a rear portion disposed towards a back of the seat, and under which no part of the battery is located.

Herein, the centre of mass of the vehicle may refer to a point which corresponds to a weighted average of a mass distribution of the vehicle. The centre of mass of the vehicle may be substantially equivalent to a centre of gravity of the vehicle. The centre of mass of the vehicle may be defined for the mass of the vehicle on its own, i.e. it does not take into account a mass of an occupant of the vehicle.

The vehicle may comprise a manual service disconnect (MSD) switch configured to disconnect battery modules in the battery from output terminals of the battery. The MSD switch may be disposed under or in front of the seat, so that it may be accessed by an occupant of the seat. For example, the MSD switch may be located under a front portion of the seating surface.

A height of the intermediate part may be smaller than a height of the first side part and the second side part. In other words, an extent of the intermediate part in a vertical direction may be smaller than an extent of the first side part and the second side part in the vertical direction. Reducing a vertical extent of the intermediate part relative to the first and second side parts may facilitate fitting the battery around the first seat, as it may avoid the intermediate part getting in the way of an occupant of the first seat. In particular, this configuration may be beneficial where the intermediate part is located towards a front of the first seat, as it may enable an occupant of the first seat to position their legs over the intermediate part. This may also be advantageous where the intermediate part is located behind the seat, as it may avoid the intermediate part getting in the way of the seat back of the first seat.

Where the height of the intermediate part is smaller than a height of the first side part and the second side part, the uppermost surface of the battery may be an upper surface of the first side part and/or the second side part. Thus, the upper surface of the first side part and/or the second side part may be located above the at least part of the seating surface. For example, both the first side part and the second side part may have a same height, which is greater than the height of the intermediate part, in which case the uppermost surface of the battery may correspond to an upper surface of the first side part and the second side part. Then, depending on the height of the intermediate part, an uppermost surface of the inter-mediate part may be higher or lower than the at least part of the seating surface.

Alternatively, in some embodiments the first side part, second side part and intermediate part may all have a same (or similar) height. In such a case, the uppermost surface of the battery may correspond to an upper surface of the first side part, the second side part and the intermediate part.

Alternatively, in some embodiments a height of the inter-mediate part may be greater than a height of the first side part and the second side part. Increasing the vertical extent of the intermediate part relative to the first and second side parts may facilitate efficient use of available space around the first seat for increasing the battery's energy storage capacity.

Where the height of the intermediate part is smaller than a height of the first side part and the second side part, the height of the intermediate part may be less than 70% of the height of the first side part and the second side part. In other words, the first side part and the second side part may have a same (or similar) height, with the height of the interme-diate part being less than 70% of the height of the side parts. In some embodiments, the height of the intermediate part may be less than 60%, 50% or 40% of the height of the first side part and the second side part. For example, the height of the intermediate part may be about 42% of the height of the first side part and the second side part. Reducing the height of the intermediate part relative to the height of the first and second side parts in this manner may facilitate fitting the battery around the first seat, particularly where the intermediate part is located towards a front or a back of the first seat.

The first side part and the second side part may have a greater length in a longitudinal direction than the interme-diate part. For example, the first side part and the second side part may extend along a length (in the longitudinal direction) of the first seat, whilst the intermediate part may have a shorter length in the longitudinal direction. This may serve to reduce an amount of space taken up by the intermediate part (e.g. in front of and/or behind the first seat), which may enable a length of the vehicle to be reduced.

A width of each of the first side part and the second side part may be smaller than a width of the intermediate part (i.e. a length of the intermediate part in a lateral direction). For example, the intermediate part may extend along a width of the first seat (in the lateral direction), whilst the widths of the first side part and the second side part may be smaller than the width of the first seat. This may serve to reduce an overall width of the vehicle.

A lower surface of the intermediate part may be higher than a lower surface of the first side part and the second side part. In other words, the lower surface of the intermediate part may be higher above a ground surface on which the vehicle is disposed compared to a lower surface of the first side part and the second side part.

The intermediate part may comprise a front intermediate part disposed towards a front of the first seat. In other words, the front intermediate part may be closer to the front of the first seat than to the back of the first seat. In some cases, the front intermediate part may be located in front of the first seat, e.g. in front of the first seat's seating surface. Providing a front intermediate part of the battery towards the front of the first seat may serve to locate the centre of mass of the vehicle closer to the front of the vehicle, thereby improving traction of front tyres of the vehicle. Additionally, the front intermediate part may be positioned such that it is located under a user's legs when they are seated in the first seat. This arrangement may thus make efficient use of available space towards the front of the first seat for increasing the battery's energy storage capacity.

The front intermediate part may be located at a front end of the first side part and the second side part. Thus, in some cases, the first side part and the second side part may terminate at (or near) the front intermediate part.

The front intermediate part may be located under a front portion of the seating surface of the first seat. In other words, at least part of the front intermediate part may be covered by the front portion of the seating surface. Thus, the front intermediate part may be arranged such that, when a user is seated in the first seat (i.e. on the seating surface), the front intermediate part is located under the user's legs. Arranging the front intermediate part under the front portion of the seating surface may avoid the front intermediate part getting in the user's way when they are sitting in the first seat, as well as when they are entering and/or exiting the vehicle.

The seating surface may be shaped such that the front portion of the seating surface extends over at least part of the front intermediate part, whilst a rear portion of the seating surface is lower than an upper surface of the intermediate part. For example, the seating surface may be angled (e.g. relative to a ground surface on which the vehicle is disposed) such that the front portion of the seating surface is higher above the ground surface compared to the front intermediate part, whilst the rear portion of the seating surface is lower above the ground surface than the upper surface of the front intermediate part. Such an angled seating surface may provide a comfortable reclined seating position for an occupant of the first seat.

An outer surface of the front intermediate part may have a shape that is complementary to a shape of the front portion of the seating surface. This may facilitate fitting the front intermediate part of the battery under the front portion of the seating surface. This may also enable an amount of space that is occupied by the front intermediate part under the front portion of the seating surface to be maximised, thus maximising the energy storage capacity of the battery.

The front intermediate part may be located under a floor of the cockpit. This may serve to minimise a height of the front intermediate part in the vehicle, as well as ensure that the front intermediate part is kept out of the way of an occupant of the first seat. The floor of the cockpit may thus act as a barrier between the front intermediate part of the battery and the inside of the cockpit. This may improve a safety of the vehicle. For example, the floor may be configured to act as a firewall between the front intermediate part and the inside of the cockpit, e.g. the floor may comprise a fire retardant material. The floor of the cockpit may correspond to a lower surface of the cockpit, at least part of which is located in front of the first seat. The front intermediate part may be disposed in a compartment (or space) which is defined between the floor of the cockpit, and an under-surface of the vehicle. Where the front intermediate part is located under the front portion of the seating surface, the compartment in which the intermediate part is disposed may be disposed at least partially under the front portion of the seating surface.

The intermediate part of the battery may comprise a back intermediate part located behind a back of the first seat. In this manner, space located behind the first seat may be used, in order to increase an energy storage capacity of the battery. Due to the location of the back intermediate part behind the first seat, it may be out of the way of an occupant of the first seat. This may enable a size (e.g. height and/or width) of the back intermediate part to be increased, without compromising a comfort of an occupant of the first seat. For example in some embodiments, a height of the back intermediate part may be greater than a height of the first side part and the second side part. The back intermediate part may be arranged such that no part of it is disposed under the seating surface, such that the presence of the back intermediate part may not increase the height of the first seat in the vehicle.

The back intermediate part may be located at a back end of the first side part and the second side part. Thus, in some cases, the first side part and the second side part may terminate at (or near) the back intermediate part. Where the intermediate part comprises both a front intermediate part and a back intermediate part, the first side part and the second side part may each extend between the front intermediate part and the back intermediate part.

Similarly to the front intermediate part discussed above, the back intermediate part may be located under the floor of the cockpit. In particular, the back intermediate part may be disposed in a compartment (or space) which is defined between the floor of the cockpit and an under-surface of the vehicle.

In some embodiments, the intermediate part may include both a front intermediate part and a back intermediate part, i.e. the battery may comprise the first and second side parts, a front intermediate part and a back intermediate part. As a result, the battery may form a loop around the first seat. In other embodiments, the intermediate part may include only one of the front intermediate and the back intermediate part.

The cockpit may contain a second seat located behind the first seat, and the back intermediate part may be located between the first seat and the second seat. In this manner, a space located between the first and second seats may be used in order to increase an energy storage capacity of the battery. The first seat and the second seat may be arranged in a tandem configuration, i.e. with the first seat and the second seat both being centred about a longitudinal axis of the vehicle. The first seat may be arranged as a driver seat, whilst the second seat may be arranged as a passenger seat. The second seat may have a similar configuration to the first seat, i.e. it may have a seating surface for receiving an occupant of the vehicle, as well as a seat back and headrest.

The back intermediate part of the battery may be arranged such that, when a user is seated in the second seat, the back intermediate part is located under the legs of the user. This may avoid the back intermediate part getting in the way of an occupant of the second seat. For example, the back intermediate part may be located under a front portion of the seating surface of the second seat. Additionally or alternatively, the back intermediate part may be located under the floor or the cockpit, e.g. in a compartment (or space) defined between the floor of the cockpit and the under-surface of the vehicle. The arrangement between the back intermediate part and the seating surface of the second seat may be similar to the arrangement between the front intermediate part and the seating surface of the first seat discussed above.

The intermediate part may further include a rear intermediate part disposed behind a back of the second seat. In this manner, space in front of the second seat may be occupied by the back intermediate part, whilst space behind the second seat may be occupied by the rear intermediate part. Due to the location of the rear intermediate part behind the second seat, it may be out of the way of an occupant of the second seat. This may enable a size (e.g. height and/or width) of the rear intermediate part to be increased, without compromising a comfort of an occupant of the second seat. The rear intermediate part may be arranged such no part of it is disposed under the seating surface of the second seat, such that the presence of the back intermediate part may not increase the height of the second seat in the vehicle. The rear intermediate part may be located under the floor of the cockpit. In particular, the rear intermediate part may be disposed in a compartment (or space) which is defined between the floor of the cockpit and the under-surface of the vehicle.

In some embodiments where the cockpit contains a second seat located behind the first seat, the intermediate part may comprise a front intermediate part disposed towards a front of the first seat, a back intermediate part located between the first seat and the second seat, and a rear intermediate part disposed behind the back of the second seat.

In some embodiments where the cockpit contains a second seat located behind the first seat, the intermediate part may include a rear intermediate part disposed behind the back of the second seat, but may not necessarily include a back intermediate part located between the first seat and the second seat.

The first side part may extend along the first side of the first seat and a first side of the second seat, and the second side part may extend along the second side of the first seat and a second side of the second seat, the second side of the second seat being opposite to the first side of the second seat. For example, the first side part may be arranged on a left-hand side of the first and second seats, and extend in a longitudinal direction of the vehicle, whilst the second side part may be arranged on a right-hand side of the first and second seats, and extend in the longitudinal direction of the vehicle. This may serve to increase a length of the first and second side parts, thus increasing an energy storage capacity of the battery. The first side part may continuously extend along the first side of the first seat and the first side of the second seat, and the second side part may extend continuously along the second side of the first seat.

The intermediate part may comprise a protruding part that extends in a longitudinal direction away from the first seat. This may serve to increase a size of the intermediate part, and thus an energy storage capacity of the battery. For example, where the intermediate part includes the front intermediate part discussed above, the protruding part may be a part of the front intermediate part that extends in a forward direction away from the first seat. The protruding part may extend in a longitudinal direction away from the first side part and the second side part. For example, where the intermediate part comprises a front intermediate part disposed towards a front of the first seat, the protruding part may extend beyond a front end of the first side part and a front end of the second side part, thereby extending the total length of the battery. The protruding part may be arranged such that, when a user is sitting on the first seat, it is located under the user's legs and/or feet. For example, the protruding part may be located under the floor of the cockpit. Additionally or alternatively, where the intermediate part includes the back intermediate part discussed above, the protruding part may be a part of the back intermediate part that extends in a rearwards direction away from the first seat.

The uppermost surface of the battery may be higher than an H-point of the first seat. This may serve to ensure a low centre of mass of the vehicle when a user is seated in the first seat. Additionally, this may serve to provide a seating position which is low in the vehicle and thus close to the ground surface. As a result, an eye-line of an occupant of the first seat may be close to the ground surface, thus providing them with a good visibility of their surroundings. The H-point of the vehicle may be defined as a location of an occupant's hip (i.e. the pivot point between the occupant's upper body and upper leg) when they are seated in the first seat, as commonly known in the field of vehicle design. In some embodiments, the H-point may be less than 250 mm above the ground surface. For example, the H-point may be 220 mm above the ground surface. This may allow the height of the centre of mass of the vehicle to be minimised and may afford the occupant improved visibility.

A width of the first side part may increase away from the intermediate part, and/or a width of the second side part may increase away from the intermediate part. In other words, a portion of the first side part that is adjacent to the intermediate part may have a smaller width than a portion of the first side part that is further from the intermediate part. Similarly, a portion of the second side part that is adjacent to the intermediate part may have a smaller width than a portion of the second side part that is further from the intermediate part. Varying the widths of the first and second side parts in this manner may enable the shapes of the first and second side parts to conform to an external shape of the vehicle, thus maximising a size of the first and second side parts.

For example, where the intermediate part includes a front intermediate part, a front portion of the first side part may have a smaller width than a rear portion of the first side part that is further from the front intermediate part. Similarly, a front portion of the second side part may have a smaller width than a rear portion of the second side part that is further from the front intermediate part. Thus, the first and second side parts may increase in width towards the back of the first seat. In this manner, the first and second side parts may be adapted to a vehicle shape with a narrow front and wider rear section.

Alternatively, in some cases the width of the first side part and/or the width of the second side part may decrease away from the intermediate part. This may be the case for example, where the intermediate part includes a back intermediate part. In that case the first and second side parts may be wider towards the back intermediate part, and decrease in width towards a front of the vehicle. In this manner, the first and second side parts may be adapted to a vehicle shape with a narrow front and wider rear section.

The battery may further comprise a housing, the housing comprising: a first side portion that extends along the first side of the first seat, and in which the first side part of the battery is disposed; a second side portion that extends along the second side of the first seat, and in which the second side part of the battery is disposed; and a connecting portion that connects the first and second side portions, and in which the intermediate part of the battery is located. Thus, the first side part, the second side part and the intermediate part of the battery may all be contained within a single housing. In this manner, the battery may be provided as a single unit. This may facilitate installing the battery, as well as removing it (e.g. for repair or replacement). The housing may act as a barrier between the battery's internal components (e.g. the battery cells and associated electronics) and the inside of the cockpit, thus protecting the battery and improving a safety of the vehicle.

A shape of the housing may be adapted to the shapes of the different parts of the battery. Thus, any features discussed above in relation to the shape and arrangement of the first side part, the second side part and the intermediate part of the battery may also be applied to the first side portion, the second side portion and the intermediate portion of the housing, respectively. Thus, where the battery includes a front intermediate part, the housing may include a front connecting portion in which the front intermediate part is located; where the battery includes a back intermediate part, the housing may include a back connecting portion in which the back intermediate part is located. As an example, where the battery includes a front intermediate part located under a front portion of the seating surface, the housing may comprise a front connecting portion that is shaped to fit under the front portion of the seating surface. In particular, an outer surface of the front connecting portion of the housing may have a shape that is complementary to a shape of the front portion of the seating surface.

One or more compartments may be defined within the housing for receiving the first side part, the second side part and the intermediate part of the battery. For example, the first side part may be disposed in a first compartment in the first side portion, the second side part may be disposed in a second compartment in the second side portion, and the intermediate part may be disposed in a third compartment in the intermediate portion. Suitable electrical connections may be provided between the different portions of the housing, in order to connect the different battery parts together. The compartments may be in communication with one another or, as discussed below, one or more barriers may be arranged between the compartments.

The first side portion, second side portion and connecting portion may be integrally formed as a single part, e.g. via a moulding or 3D printing process. Alternatively, they may be manufactured as separate parts which are subsequently assembled together. The first side portion and the second side portion may be rigidly connected to the connecting portion, such that the relative positions of the first side portion and the second side portion are fixed by the connecting portion. The housing may be made of any suitable material(s). For example, the housing may comprise one or more of the following materials: plastic, composite materials (e.g. composite materials including glass fibres, aramid fibres and/or carbon fibres), or metallic materials (e.g. steel or aluminium).

In some embodiments, the housing may comprise a base plate on which the plurality of battery cells of the first side part, the second side part and the intermediate part of the battery are mounted, and one or more covers attached to the base plate and arranged to cover the plurality of battery cells of the first side part, the second side part and the intermediate part. Such a structure of the housing may facilitate arranging the battery cells in accordance with a desired shape, as well as ensure that they are adequately supported within the housing. The one or more covers may be attached to the base plate using any suitable means, e.g. using fasteners such as nuts and bolts or screws. In one example, the base plate may formed by a carbon fibre material having a honeycomb or structural foam core, e.g. where a core material is sandwiched between carbon fibre panels. Such a base plate may be relatively lightweight whilst providing a suitable strength and rigidity for supporting the battery cells.

The battery may further comprise a first barrier located between the first side portion and the connecting portion, the first barrier being configured to restrict fire propagation between the first side portion and the connecting portion. In this manner, if there is a malfunction in the first side part or the intermediate part, a risk of fire propagating between the two parts may be minimised. Compartmentalising the battery housing in this way may thus serve to improve a safety of the battery. The first barrier may be disposed within the housing, at an interface between the first side portion and the connecting portion. The first barrier may be made of any suitable fire retarding material. The first side part and the intermediate part of the battery may be electrically connected via one or more electrical connectors (e.g. cables or wires) that pass through or around the first barrier. For example, the first barrier may include an aperture through which the one or more electrical connectors extend, and/or the housing may include a passageway for routing the one or more electrical connectors around the first barrier.

The battery may further comprise a second barrier located between the second side portion and the connecting portion, the second barrier may be configured to restrict fire propagation between the second side portion and the connecting portion. In this manner, if there is a malfunction in the second side part or the intermediate part, a risk of fire propagating between the two parts may be minimised. Compartmentalising the battery housing in this way may thus serve to improve a safety of the battery. The second barrier may be disposed within the housing, at an interface between the second side portion and the connecting portion. The first barrier may be made of any suitable fire retarding material. The second side part and the intermediate part of the battery may be electrically connected via one or more electrical connectors (e.g. cables or wires) that pass through or around the second barrier. For example, the second barrier may include an aperture through which the one or more electrical connectors extend, and/or the housing may include a passageway for routing the one or more electrical connectors around the second barrier.

As an example, aramid materials may be used for the first barrier and/or second barrier. Other suitable materials for the first and second barriers include composite materials such as glass fibre materials. The first barrier and/or second barrier may include plastic materials having flame retardant materials, such as Polytetrafluoroethylene (PTFE) (e.g. in PTFE fibreglass sheets). The first barrier and/or second barrier may also include metallic materials (e.g. steel), in order to provide rigidity to the barrier.

One or more flow paths for a coolant may be defined within the housing, such that the one or more flow paths may extend through at least part of the first side portion, the connecting portion, and the second side portion. In this manner, coolant may be flowed along the one or more flow paths, in order to remove heat from each of the first side portion, the connecting portion, and the second side portion, to maintain the battery at a suitable working temperature, or decrease a temperature of the battery. In particular, this may enable heat to be removed from the first side part, the intermediate part and the second side part. Additionally or alternatively, coolant may be flowed along the one or more flow paths, in order to provide heat to each of the first side portion, the connecting portion, and the second side portion, to maintain the battery at a suitable working temperature, or increase a temperature of the battery. Thus, providing each of the first side part, the intermediate part and the second side part within a single housing may facilitate thermal conditioning of the battery. For example, this may enable a single thermal conditioning system to be used for conditioning the different parts of the battery, which may simplify construction of the battery and reduce an overall weight of the battery.

The one or more flow paths may be arranged such that, when coolant is flowed along the one or more flow paths, heat is exchanged between the coolant and each of the first side part, the intermediate part and the second side part. For instance, the one or more flow paths may be in thermal contact (either directly or indirectly) with the first side part, the intermediate part and the second side part, such that heat generated in each of the first side part, the intermediate part and the second side part may be transferred to coolant flowing along the one or more flow paths. The one or more flow paths may be defined by one or more passageways (e.g. channels) disposed within the housing.

The coolant may be any suitable type of coolant fluid (e.g. gas or liquid). For example, the coolant may include air or water. Preferably, the coolant may include a non-conducting (i.e. dielectric) fluid, such as oil or nitrogen.

The battery may comprise a coolant source, which is configured to cause coolant to flow along the one or more flow paths. The coolant source may be adapted to the particular type of coolant used. For example, the coolant source may include one or more of a fan, a pump and a coolant reservoir. The coolant source may be part of a thermal conditioning system of the battery, which may further include a heat exchanger configured to remove heat from the coolant (e.g. after the coolant has passed through the one or more flow paths in the housing), and/or a heater configured to provide heat to the coolant (e.g. before the coolant passes through the one or more flow paths in the housing).

In some embodiments, the one or more flow paths may comprise a single flow path that extends continuously through the first portion, the connecting portion and the second portion of the housing. This may simplify the thermal conditioning system, as a single flow path may be used to cool and/or heat the different parts of the battery. In particular, this may reduce a number of connections required between the flow path and the coolant source and any heat exchangers or heaters.

Additionally or alternatively, the one or more flow paths may comprise multiple flow paths, each of which is arranged to remove heat from, and/or provide heat to, a respective region in the housing. Each of the multiple flow paths may then be individually connected to the coolant source, such that the coolant source may cause coolant to flow along each of the multiple flow paths. Using different flow paths for conditioning different regions in the housing may serve to minimise heat transfer between the different regions in the housing, which may facilitate maintaining the battery at a suitable working temperature. For example, a first flow path may extend through the first side portion, a second flow path may extend through the second side portion, and a third flow path may extend through the connecting portion. However, each of the multiple flow paths need not be limited to a single portion of the housing. Thus, a flow path may, for instance, extend through part of two portions of the housing.

A first terminal of the battery may be located at the first side part, and a second terminal of the battery may be located at the second side part. This may enable the first and second terminal to be located opposite one another (as the first and second side parts are on opposite sides of the first seat), such that they may be relatively close together. This may facilitate making electrical connections to the battery, without having to use a long busbar or cable to bring the two terminals close together. This may serve to reduce a mass of the vehicle, as well as minimise electromagnetic interference which could be caused by a long busbar or cable. The first terminal may, for example, be a positive terminal of the battery, whilst the second terminal may be a negative terminal of the battery.

Where the battery comprises a housing as discussed above, the first terminal may be located at an end region of the first side portion and the second terminal may be located at an end region of the second side portion, the end region of the first side portion being located at an end of the first side portion that is opposite to an end of the first side portion which is connected to the connecting portion, and the end region of the second side portion being located at an end of the second side portion that is opposite to an end of the second side portion which is connected to the connecting portion. In other words, the first terminal and the second terminal may be located at opposite ends of the first and second portions of the housing from the connecting portion. Arranging the first and second terminals at the end regions of the first and second portions, may facilitate making electrical connections to the battery. In particular, by locating the first and second terminals at the end regions of the first and second portions, they may be closer to other components of a traction circuit of the vehicle such as an electric motor, inverter or HV distribution module of the vehicle. This may enable shorter connecting cables to be used, which may facilitate a construction of the vehicle as well as reduce a mass of the vehicle. For example where the connecting portion is a front connecting portion located towards the front of the first seat, the end regions of the first and second portions may be located towards a rear of the vehicle, where an electric motor for driving the rear wheels may be located. Alternatively where the connecting portion is a back connecting portion located behind the back of the first seat, the end regions of the first and second portions may be located towards a front of the vehicle, where an electric motor for driving the front wheels may be located.

The battery may further comprise: a plurality of battery modules disposed in each of the first side part, second side part and intermediate part, each battery module comprising a respective subset of battery cells; a plurality of module monitoring units disposed in each of the first side part, second side part and intermediate part and arranged to monitor the plurality of battery modules; and a battery control unit, the battery control unit being connected to at least a first one of the module monitoring units that is disposed in the first side part and a second one of the module monitoring units that is disposed in the second side part. This arrangement may facilitate connecting the battery control unit to the module monitoring units, as the first module monitoring unit in the first part and the second module monitoring unit in the second part may be opposite one another (as the first and second parts of the battery are on opposite sides of the first seat), such that they are relatively close to one another.

The plurality of battery cells in each of the first part, second part and intermediate part of the battery may be arranged into a plurality of battery modules, with each battery module including a respective subset of the plurality of battery cells. Additionally, each of the first part, second part and intermediate part may include a plurality of module monitoring units. Each module monitoring unit may be associated with one or more of the battery modules. Each module monitoring unit may be configured to detect one or more parameters relating to a status of the one or more battery cells and/or modules that it is associated with. For example, parameters that may be detected by a module monitoring unit may include a temperature, voltage, and/or charge state of each of the one or more battery modules that it is associated with.

The battery control unit may be configured to communicate with each of the module monitoring units, so that it can transmit a signal (i.e. information) to, and receive a signal from, each of the module monitoring units. In this manner, the battery control unit may receive data indicative of the one or more parameters detected by the module monitoring units. Thus, the battery control unit may enable the status of the plurality of battery modules to be monitored centrally.

The battery control unit may further be configured to control charging of the plurality of battery modules. For example, the battery control unit may be configured to control a charging voltage and/or charging current supplied to the plurality of battery modules, in order to charge the battery cells in each of the battery modules. The battery control unit may be configured to control charging of the plurality of battery modules based on the data indicative of the one or more parameters detected by the module monitoring units. This may enable the battery control unit to ensure safe and efficient charging of the battery modules. For instance, the battery control unit may ensure that the temperature of the battery modules does not exceed a threshold temperature during charging. The battery control unit may be configured to adjust one or more charging parameters (e.g. a charging voltage and/or charging current supplied to the plurality of battery modules) based on the data received from the module monitoring units.

The plurality of module monitoring units may be communicatively coupled to one another, e.g. via suitable wired connections, so that information may be communicated between the module monitoring units. For example, each of the plurality of module monitoring units may be communicatively coupled to at least one adjacent module monitoring unit. Then, as the battery control unit is connected to the first module monitoring unit in the first side part and the second battery module in the second side part, the battery control unit may communicate with each of the plurality of module monitoring units via the connections between the module monitoring units. This may minimise a number of module monitoring units than need to be directly connected to the battery control unit. Additionally, as the battery control unit is connected to at least one module monitoring unit in each side part of the battery, the battery control unit may be able to communicate with each module monitoring unit, even if a connection between two of the module monitoring units breaks. Thus, a reliability of the battery may be improved.

The battery control unit may be located between the first side part and the second side part. This may facilitate connecting the battery control unit to the first module monitoring unit in the first side part and second module monitoring unit in the second part, as the battery control unit may be located between the first and second module monitoring units.

The first side part may comprise a first side impact absorbing structure, and/or the second side part may comprise a second side impact absorbing structure. The side impact absorbing structures may serve to protect an occupant of the vehicle in case of a side impact to the vehicle, thus reducing a risk of injury to the occupant. In particular, as the first side part and the second side part of the battery are located on opposite sides of the first seat, incorporating side impact absorbing structures into the first and second side parts may serve to protect an occupant of the first seat.

The first and/or second side impact absorbing structure may be configured to absorb an impact to the side of the vehicle. For example, a side impact absorbing structure may be configured to decelerate an object (e.g. car) which impacts a corresponding side of the vehicle.

A side impact absorbing structure may be made of materials and have a design that are configured to absorb and dissipate a large amount of energy during an impact. For example, a side impact absorbing structure may be configured to be crushed or deformed during an impact, in order to absorb energy from the impact. A side impact absorbing structure including metallic materials (e.g. made of steel) may be designed to absorb energy by deforming permanently. A side impact absorbing structure including composite materials (e.g. carbon fibre materials) may be designed to absorb energy by fracturing, collapsing and/or disintegrating. A side impact absorbing structure may have a box-like structure which is arranged to deform (e.g. crumple, collapse, fracture) during an impact to absorb and dissipate energy from the impact. As an example, a side impact absorbing structure may have an outer shell formed of carbon fibre, and a core made of aluminium honeycomb or a structural foam.

The first side impact absorbing structure may be arranged around at least part of the first side part of the battery. Where the battery comprises a housing as discussed above, the first side impact absorbing structure may be a part of the first side portion of the housing, e.g. the first side impact absorbing structure may form a sidewall of the first side portion. Similarly, the second side impact absorbing structure may be a part of the second side portion of the housing, e.g. the second side impact absorbing structure may form a sidewall of the second side portion.

A first sidewall of the cockpit may be disposed between the first seat and the first side part, and a second sidewall of the cockpit may be disposed between the first seat and the second side part. In this manner, the first and second side parts of the battery may be separated from the inside of the cockpit by sidewalls of the cockpit. This may serve to protect an occupant of the cockpit from high temperatures and/or a fire which could arise in the battery in case of a malfunction of the battery. The first sidewall and the second sidewall of the cockpit may comprise a fire retardant material, for further improving a safety of the cockpit.

The vehicle may comprise an external body, the cockpit being disposed inside the external body; the first side part may be disposed within a first compartment defined between the first sidewall and the external body; and the second side part may be disposed within a second compartment defined between the second sidewall and the external body. In this manner, the first and second side parts of the battery may be separated from the inside of the cockpit, whilst being protected by the external body of the vehicle. The external body of the vehicle may define an outer surface (or outer shell) of the vehicle.

Alternatively, the vehicle may comprise an external body, the cockpit being disposed inside the external body; the first side part may be disposed in a first compartment defined on an outside of the external body; and the second side part may be disposed in a second compartment defined on the outside of the external body. In this manner, the first side part and the second side part of the battery may be located on an outside of the external body, which may serve to effectively isolate the first and second side parts from the inside of the cockpit.

The first compartment and the second compartment may be formed as part of the external body. The first compartment and the second compartment may be sealed, in order to protect the first side part and the second side part of the battery from the external environment.

As discussed above, in some cases, the intermediate part of the battery may be disposed in a compartment (or space) which is defined between the floor of the cockpit, and an under-surface of the vehicle. Thus, the connecting portion of the housing may form or be disposed in the compartment between the floor of the cockpit and the under-surface of the vehicle. In further cases, the intermediate part of the battery may be disposed at least partially on the under-surface of the vehicle. For example, the connecting portion of the housing may form part of an under-surface of the vehicle. This may minimise a height at which the intermediate part of the battery is disposed within the vehicle, thus minimising a height of the centre of mass of the vehicle.

In a second aspect, the invention provides a battery for an electric vehicle. At its most general, the battery of the second aspect comprises a first side part configured to extend along a first side of a first seat of the vehicle, a second side part configured to extend along a second, opposite side of the first seat, and an intermediate part arranged to extend between the first side part and the second side part, each of the first part, second part and intermediate part comprising a plurality of battery cells.

According to the second aspect of the invention, there is provided a battery for an electric vehicle, the battery comprising: a housing comprising a first side portion configured to extend along a first side of a first seat of the vehicle, a second side portion configured to extend along a second, opposite, side of the first seat, and a connecting portion that connects the first and second side portions; and a plurality of battery cells disposed in the housing and arranged in each of the first side portion, second side portion and connecting portion of the housing. Any features discussed above in relation to the battery in the vehicle of the first aspect of the invention may be applied to the battery of the second aspect of the invention.

Herein, a longitudinal direction may refer to a direction along a longitudinal axis of the vehicle, i.e. a direction along an axis linking a front of the vehicle to a rear of the vehicle. In other words, the longitudinal direction may correspond to a direction of forward motion of the vehicle. A lateral direction may refer to a direction perpendicular to the longitudinal direction, i.e. a direction along an axis linking a right-hand side to a left-hand side of the vehicle. Herein, a width may generally refer to a width (or length) in the lateral direction of the vehicle, unless stated otherwise.

BRIEF DESCRIPTION OF THE DRAWINGS

Embodiments of the invention are discussed below with reference to the accompanying drawings, in which.

DETAILED DESCRIPTION: FURTHER OPTIONAL FEATURES

Figure 1:
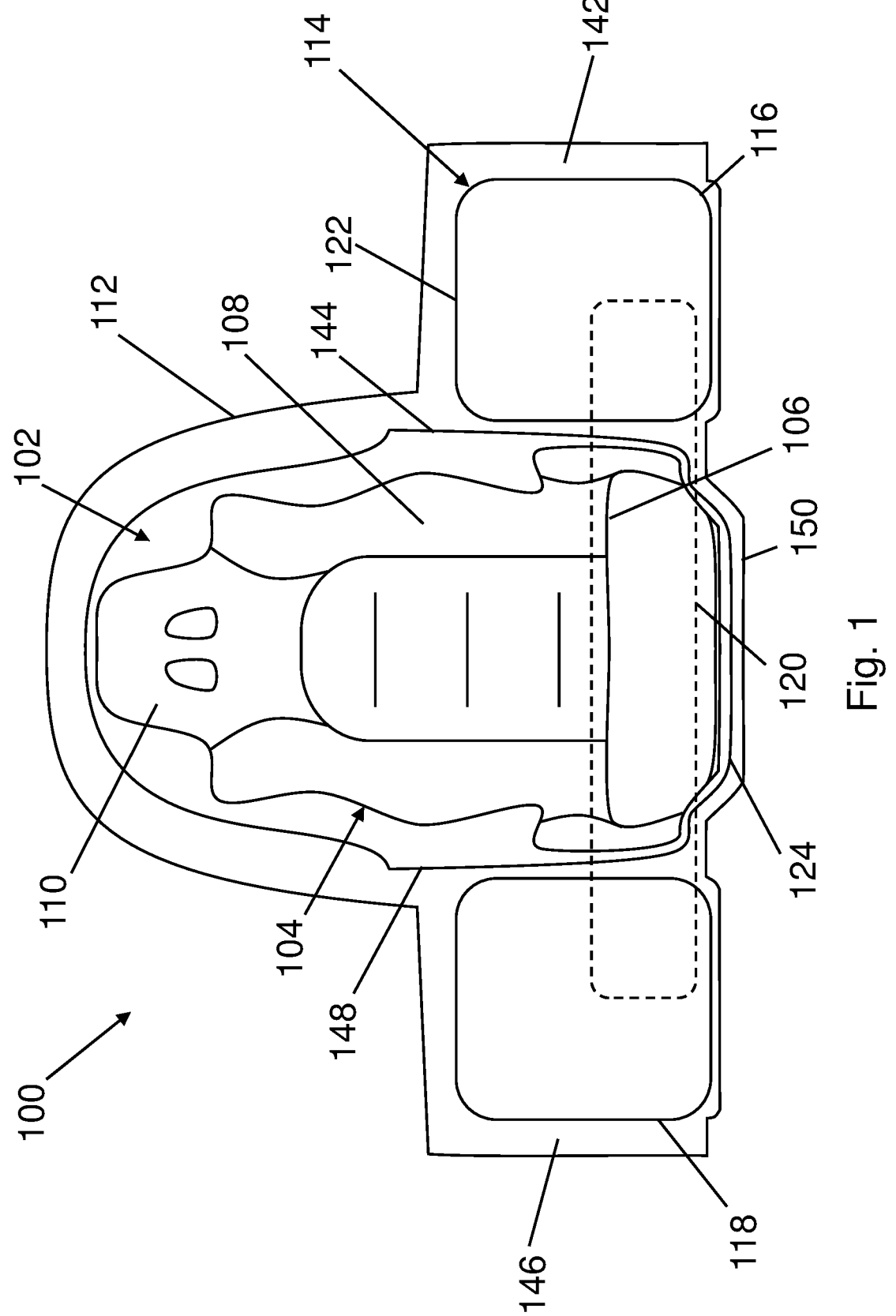
FIG. 1 is a schematic cross-sectional front view of an electric vehicle according to an embodiment of the invention.

FIG. 1 shows a schematic front cross-sectional view of part of an electric vehicle 100 according to an embodiment of the invention. The vehicle 100 is a road car, and may include four wheels that are coupled to a chassis of the vehicle 100. The vehicle 100 comprises a cockpit 102 in which a single seat 104 is located, the seat 104 being configured to receive an occupant of the vehicle 100. In particular, the seat 104 includes a seating surface 106, a seat back 108 and a headrest 110. Thus, the cockpit 102 is designed to receive only a single occupant, namely the driver of the vehicle 100 (or a passenger in a case where the vehicle 100 is self-driving). In addition to the seat 104, the cockpit 102 contains any controls and displays necessary for controlling the vehicle 100, e.g. steering wheel, accelerator pedal, brake pedal, dashboard.

The cockpit 102 is housed within an external body 112 of the vehicle 100, the external body 112 serving to define an outer surface of the vehicle 100. The cockpit 102 may be defined at least in part by a monocoque disposed within the external body 112 of the vehicle 100. In particular, a floor and sides of the cockpit 102 may be defined by the monocoque. The monocoque may be a shell-like structure which is integrally formed (e.g. moulded) as a single part. The monocoque may, for example, be made of a carbon fibre material. The external body 112 may be formed around the monocoque, and may comprise a similar material to the monocoque, as well as other materials such as plastics, composite materials such as reinforced polymers (e.g. carbon fibre reinforced polymers), metals (e.g. aluminium, steel), or any other suitable materials. In some cases, the external body 112 and the monocoque defining the cockpit 102 and a chassis of the vehicle 100, may be integrally formed as a single structure. The vehicle 100 further includes a battery 114 which is arranged around the seat 104.

Figures 2, 3:
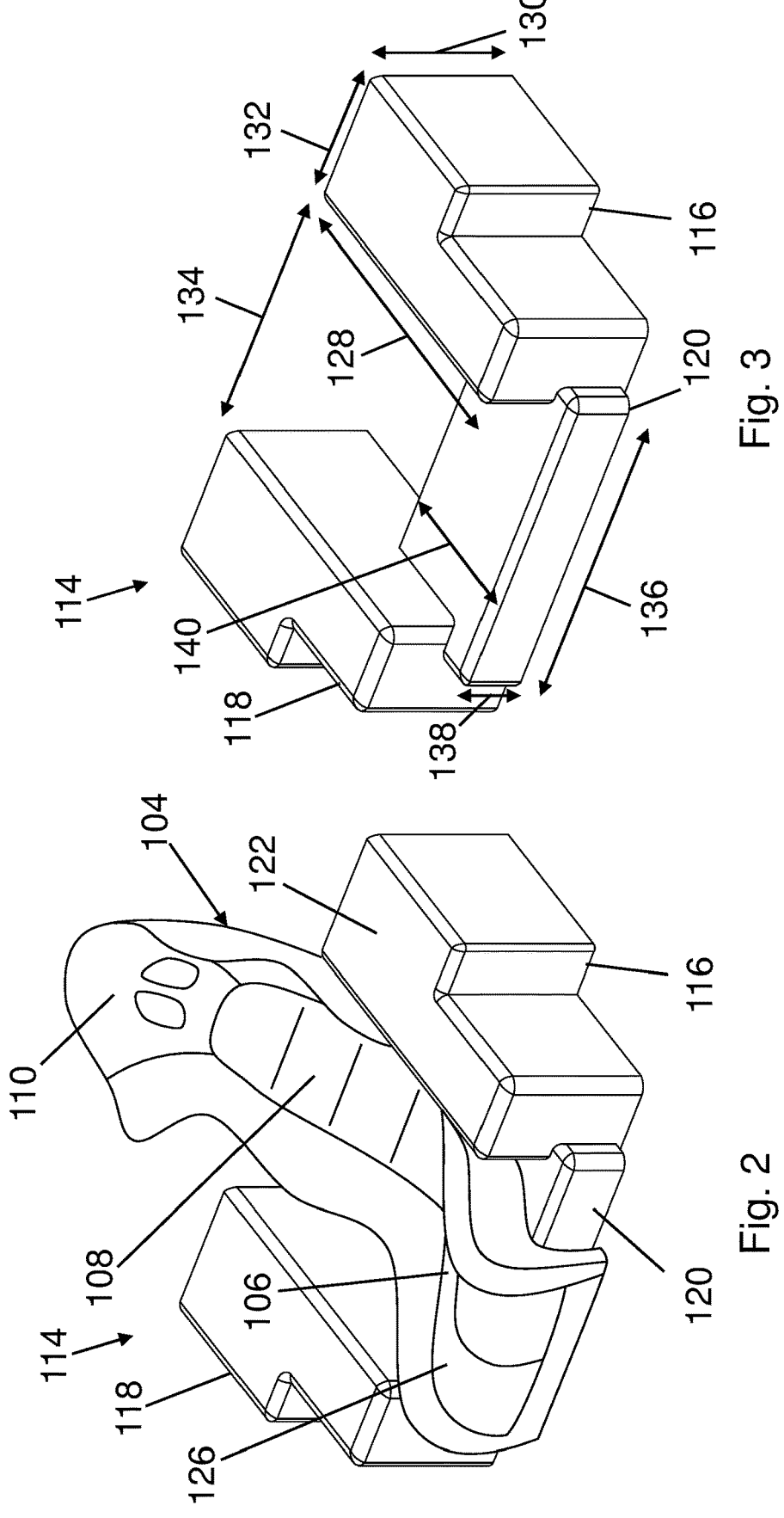
FIG. 2 is a schematic perspective view of a seat and battery arrangement of the vehicle of FIG. 1.
FIG. 3 is a schematic perspective view of a battery according to an embodiment of the invention.

FIG. 2 shows a schematic perspective view of the seat 104 and the battery 114 arranged around it, where the surrounding cockpit 102 and external body 112 have been omitted for illustration purposes. FIG. 3 shows a schematic perspective view of the battery 114 on its own. The battery 114 has a "U" shape (or horseshoe-like shape), such that it fits around the seat 104. In particular, the battery 114 includes a single housing which is shaped to fit around the seat 104, and in which components of the battery 114 are arranged. The housing of the battery 114 includes a first side portion 116 that extends along a left-hand side of the seat 104, a second side portion 118 that extends along a right-hand side of the seat 104, and a connecting portion 120 that is disposed at front ends of the first and second side portions 116, 118 and connects the first and second side portions 116, 118. Thus, the connecting portion 120 is arranged towards a front of the seat 104. The position of the connecting portion 120 is indicated by the dashed lines in FIG. 1. A first part of the battery including a first plurality of battery cells is disposed within the first side portion 116, a second part of the battery including a second plurality of battery cells is disposed within the second side portion 118, and a third part of the battery including a third plurality of battery cells is disposed within the connecting portion 120. An example of the internal structure of the battery 114 is discussed in more detail below in relation to FIGS. 9a and 9b.

The battery 114 is configured to power an electric motor (not shown) in the vehicle 100, for driving wheels of the vehicle 100, e.g. for applying a torque to wheels of the vehicle 100. The battery 114 may be connected to the electric motor via any suitable electrical components, such as an inverter and control unit. The vehicle 100 may either be a front-wheel, rear-wheel, or four-wheel drive vehicle. In the last case, the vehicle 100 may include two electric motors (e.g. one for driving front wheels and one for driving rear wheels of the vehicle 100), in which case the battery 114 may be configured to power both electric motors. In further cases a respective electric motor may be provided in order to power each wheel independently, in which case the battery 114 may be configured to power each electric motor. This may enable the use of torque vectoring, in order to improve swerving performance of the vehicle 100.

The seat 104 is arranged such that its seating surface 106 is lower than an uppermost surface of the battery 114. In the example shown, the uppermost surface of the battery 114 corresponds to an upper surface 122 of the first and second side portions 116, 118 of the housing. The seat 104 is mounted on a floor 124 of the cockpit 102, in order to minimise its height in the vehicle 100 and reduce a height of a centre of mass of the vehicle 100. As shown in FIG. 1, no part of the battery 114 is located under at least part of the seating surface 106. In particular, no part of the battery 114 is located under a rear portion of the seating surface 106 located towards the seat back 108.

The connecting portion 120 of the housing extends under a front portion 126 of the seating surface 106. To facilitate locating the connecting portion 120 under the front portion 126 of the seating surface 106, a height of the connecting portion 120 is reduced compared to the first and second side portions 116, 118. Thus, the intermediate part of the battery located in the connecting portion 120 may have a smaller height than the first and second side parts of the battery located in the first and second side portions 116, 118. Furthermore, as can be seen in FIG. 2, the seating surface 106 is angled such that the rear portion of the seating surface 106 is lower than the front portion 126 of the seating surface 106. In this manner, the connecting portion 120 may extend under the front portion 126 of the seating surface 106 without increasing a height of the seat 104 in the vehicle 100. Moreover, the angled seating surface 106 may result in a comfortable reclined sitting position for an occupant of the seat 104.

Example dimensions of the battery 114 are now provided with reference to FIG. 3. A length 128 of the first and second side portions 116, 118 in a longitudinal direction of the vehicle 100 may correspond approximately to a length of the seat 104. For example, the length 128 of the first and second side portions 116, 118 may be between about 700 mm and 1000 mm, e.g. approximately 880 mm. A height 130 in a vertical direction of the first and second side portions 116, 118 may be increased in order to increase an energy storage capacity of the battery 114, as long as the height 130 of the first and second side portions 116, 118 does not overly restrict a visibility of an occupant of the seat 104 and/or access to the cockpit 102. For example, the height 130 of the first and second side portions 116, 118 may be between about 300 mm and 450 mm, e.g. approximately 360 mm. A width of the first and second side portions 116, 118 in a lateral direction of the vehicle 100 increases away from the connection portion 120. In particular, each of the first and second side portions 116, 118 includes a front portion having a first width, and a rear portion having a second, larger width. This is to conform a shape of the first and second side portions 116, 118 to an external shape of the vehicle 100, which may increase in width towards its middle. A maximum width 132 of the first and second side portions 116, 118 may be between about 300 mm to 450 mm, e.g. about 370 mm.

A distance 134 between the first and second side portions 116, 118 may correspond approximately to a width of the seat 104. For example the distance 134 between the first and second side portions 116, 118 may be between about 550 mm and 850 mm, e.g. about 700 mm. A width 136 of the connecting portion 120 in the lateral direction may correspond to at least the width of the seat 104. For example, the width 136 of the connecting portion 120 may be between about 550 mm to 850 mm, e.g. approximately 720 mm. A height 138 of the connecting portion 120 in the vertical direction may be less than 70% of the height of the first and second side portions 116, 118, e.g. to facilitate fitting in under the front portion 126 of the seating surface 106. For example, the height 138 of the connecting portion 120 may be between about 100 mm to 200 mm, e.g. approximately 150 mm. A length 140 of the connecting portion 120 in the longitudinal direction may be between about 450 mm to 650 mm, e.g. about 550 mm. As can be seen in FIGS. 2 and 3, the connecting portion 120 protrudes in the longitudinal direction beyond the front ends of the first and second side portions 116, 118.

Returning to FIG. 1, the first side portion 116 of the battery housing is located within a first compartment 142 which is defined between a left-hand sidewall 144 of the cockpit 102 and the external body 112. In particular, as shown in FIG. 1, the external body 112 extends around part of the first side portion 116, to form a compartment with the left-hand sidewall 144 around the first portion 116. In this manner, the first side portion 116 (and hence the first side part of the battery 114 located therein) is separated from the inside of the cockpit 102, whilst being protected. The first compartment 142 may be sealed, in order to further protect the first side portion 116. Likewise, the second side portion 118 of the battery housing is located within a second compartment 146 which is defined between a right-hand sidewall 148 of the cockpit 102 and the external body 112. In particular, as shown in FIG. 1, the external body 112 extends around part of the second side portion 118, to form a compartment with the right-hand sidewall 148 around the second portion 118. In this manner, the second side portion 118 (and hence the second side part of the battery 114 located therein) is separated from the inside of the cockpit 102, whilst being protected. The second compartment 146 may be sealed, in order to further protect the second side portion 118.

As mentioned above, the connecting portion 120 is disposed under the front portion 126 of the seating surface 106. Additionally, the floor 124 of the cockpit 102 extends over the connecting portion 120, such that the connecting portion 120 (and thus the intermediate part of the battery 114 located therein) is separated from the inside of the cockpit 102 by the floor 124.

The connecting portion 120 is located in a compartment (or space) which is defined between the floor 124 of the cockpit 102 and an under-surface 150 of the vehicle 100 (the under-surface 150 of the vehicle 100 is shown in FIG. 1). The floor 124 has a shape which is complementary to a shape of an underside of the seat 104, as well as to a shape of the connecting portion 120 of the housing. In this manner, a space taken up by the connecting portion 120 under the front portion 126 of the seating surface 106 may be maximised, to increase an energy storage capacity of the battery 114. As shown in FIG. 1, the under-surface 150 of the vehicle 100 and is not flat. In particular, a portion of the under-surface 150 over which the seat 104 is mounted is lower (i.e. closer to the ground) compared to portions of the under-surface 150 over which the first and second side portions 116, 118 of the battery housing are located. The portion of the under-surface 150 over which the seat 104 is mounted comprises a recess (or cavity), with a corresponding recess (or cavity) being formed in the floor 124 of the cockpit 102. The seat 104 is mounted in the recess in the floor 124 of the cockpit 102, such that it is mounted lower in the vehicle 100 compared to the battery 114.

Figures 4, 5, 6:
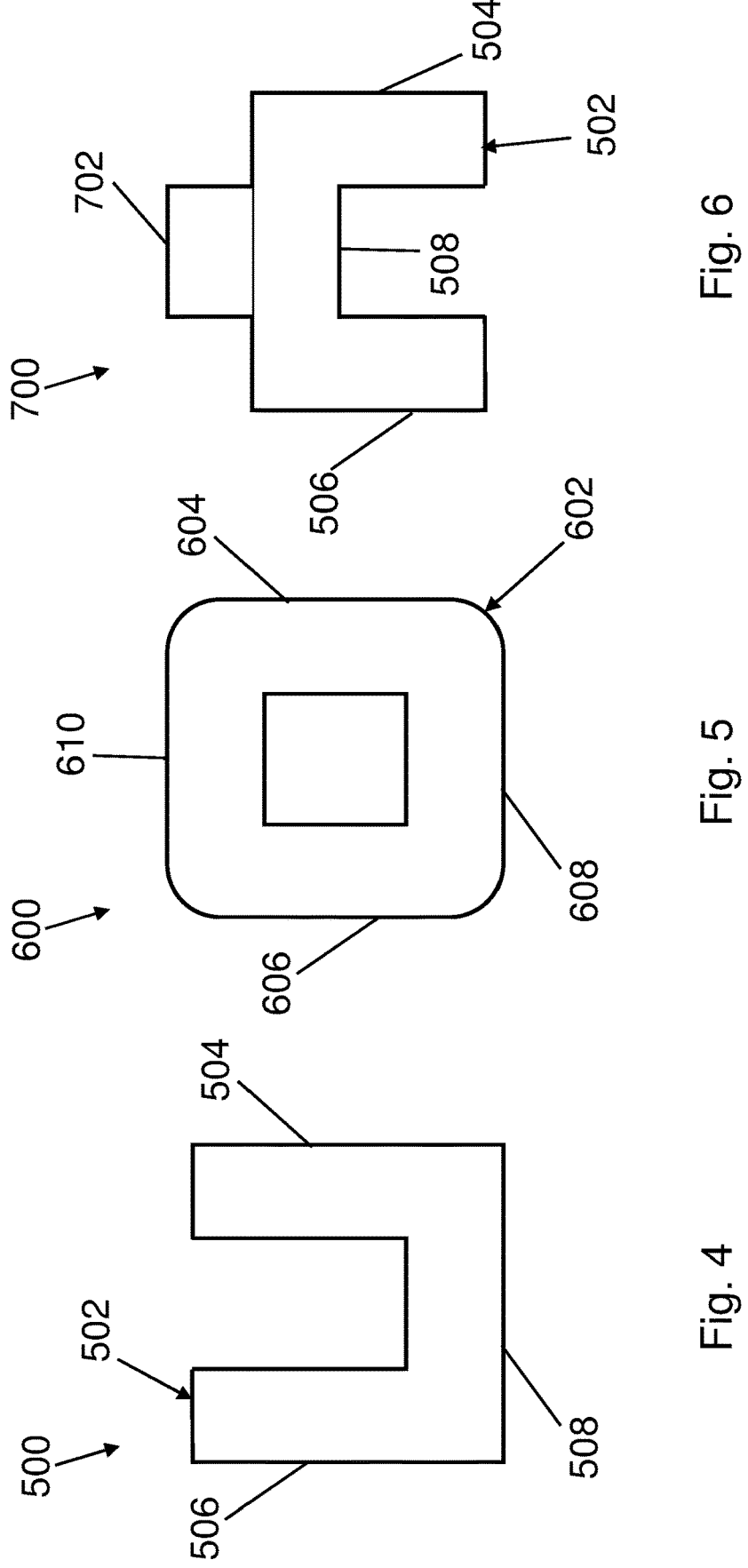
FIG. 4 is a schematic top view of a battery according to an embodiment of the invention.
FIG. 5 is a schematic top view of a battery according to an embodiment of the invention.
FIG. 6 is a schematic top view of a battery according to an embodiment of the invention.

FIGS. 4, 5 and 6 illustrate different shapes of batteries according to embodiments of the invention. FIGS. 4, 5 and 6 show schematic top views of batteries 500, 600 and 700, respectively. Each of batteries 500, 600 and 700 is designed to be used in an electric vehicle, and is shaped to fit around a seat of the electric vehicle. In particular, each of batteries 500, 600 and 700 may be used in a single-seat electric vehicle.

The battery 500 comprises an outer housing 502, including a first side portion 504 which is configured to extend along a first side of the seat of the vehicle, a second side portion 506 which is configured to extend along a second, opposite side of the seat, and a connecting portion 508 which extends between ends of the first and second side portions 504, 506 to connect them together. The first side portion 504 and the second side portion 506 are approximately parallel, and spaced apart so as to define a space between them for the seat of the vehicle. In particular, the first side portion 504 and the second side portion 506 may be spaced by a distance corresponding approximately to a width of the seat of the vehicle. A first part of the battery 500 including a first plurality of battery cells is arranged within the first side portion 504 of the housing 502, a second part of the battery 500 including a second plurality of battery cells is arranged within the second side portion 506 of the housing 502, and an intermediate part of the battery 500 including a third plurality of battery cells is arranged within the connecting portion 508.

In some embodiments, the connecting portion 508 may be configured to be disposed towards a front of the seat of the vehicle, in which case the first side portion 504 may be configured to extend along a left-hand side of the seat and the second side portion 506 may be configured to extend along a right-hand side of the seat. Thus, the battery 500 may be arranged around the seat in a similar manner to the battery 114 with respect to the seat 104 discussed above. Alternatively, the connecting portion 508 may be configured to be disposed behind a back of the seat of the vehicle, in which case the first side portion 504 may be configured to extend along a right-hand side of the seat and the second side portion 506 may be configured to extend along a left-hand side of the seat.

The battery 600 similarly comprises an outer housing 602, including a first side portion 604 which is configured to extend along a left-hand side of the seat of the vehicle, and a second side portion 606 which is configured to extend along a right-hand side of the seat. Additionally, the housing 602 includes a front connecting portion 608 which is connected between front ends of the first and second portions 604, 606, and a back connecting portion 610 which is connected between back ends of the first and second portions 604, 606. The front connecting portion 608 is configured to be disposed towards a front of the seat, whilst the back connecting portion 610 is configured to be disposed behind a back of the seat. The first side portion 604 and the second side portion 606 are spaced apart and approximately parallel to one another. Similarly, the front connecting portion 608 and the back connecting portion 610 are spaced apart and approximately parallel. A space is defined between the first and second portions 604, 606 and the front and back connecting portions 608, 610, in which the seat may be located. Thus, the battery 600 may form a loop around the seat. A first part of the battery 600 including a first plurality of battery cells is arranged within the first side portion 604 of the housing 602, a second part of the battery 600 including a second plurality of battery cells is arranged within the second side portion 606 of the housing 602, a front intermediate part of the battery 600 including a third plurality of battery cells is arranged within the front connecting portion 608, and a back intermediate part of the battery 600 including a fourth plurality of battery cells is arranged within the back connecting portion 610.

The battery 700 has a similar shape and arrangement to the battery 500 discussed above. For convenience, features of the battery 700 corresponding to those of battery 500 are labelled in FIG. 6 with the same reference numerals as in FIG. 4, and are not described again. However, the connecting portion 508 of the housing 502 further includes a protruding portion 702 which extends in a longitudinal direction away from the first and second side portions 504, 506. Correspondingly, the intermediate part of the battery 700 located inside the connecting portion 508 of the housing 502 may include a protruding part located in the protruding portion 702 of the housing. As an example, where the connecting portion 508 is arranged towards a front of the seat of the vehicle, the protruding portion 702 is arranged to extend from the connecting portion 508 in a forward direction of the vehicle. For instance, the protruding portion 702 may extend under a floor of a cockpit of the vehicle.

Figure 8:
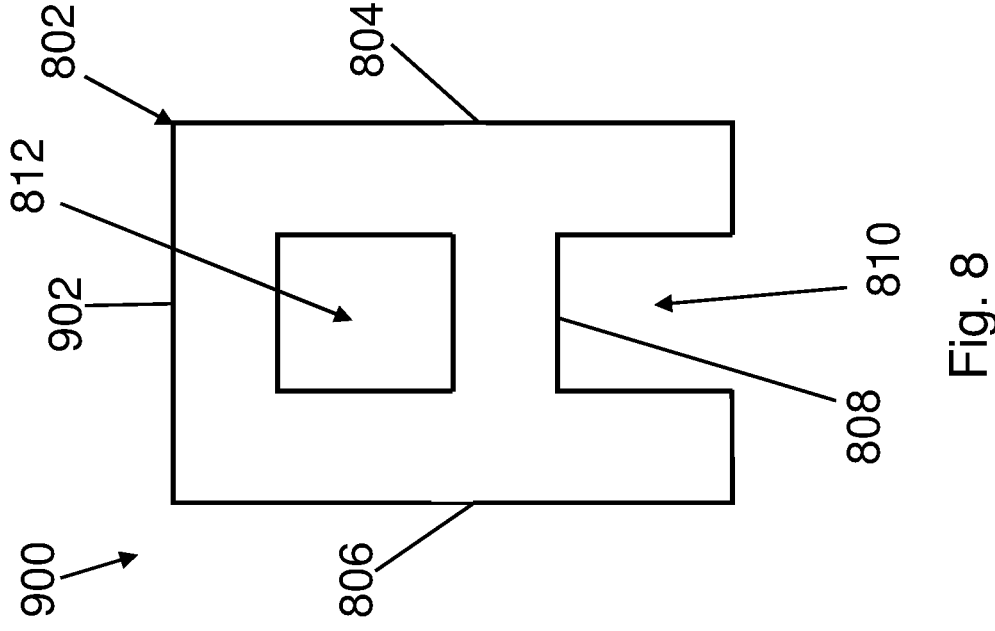
FIG. 8 is a schematic top view of a battery according to an embodiment of the invention.
Figure 7:
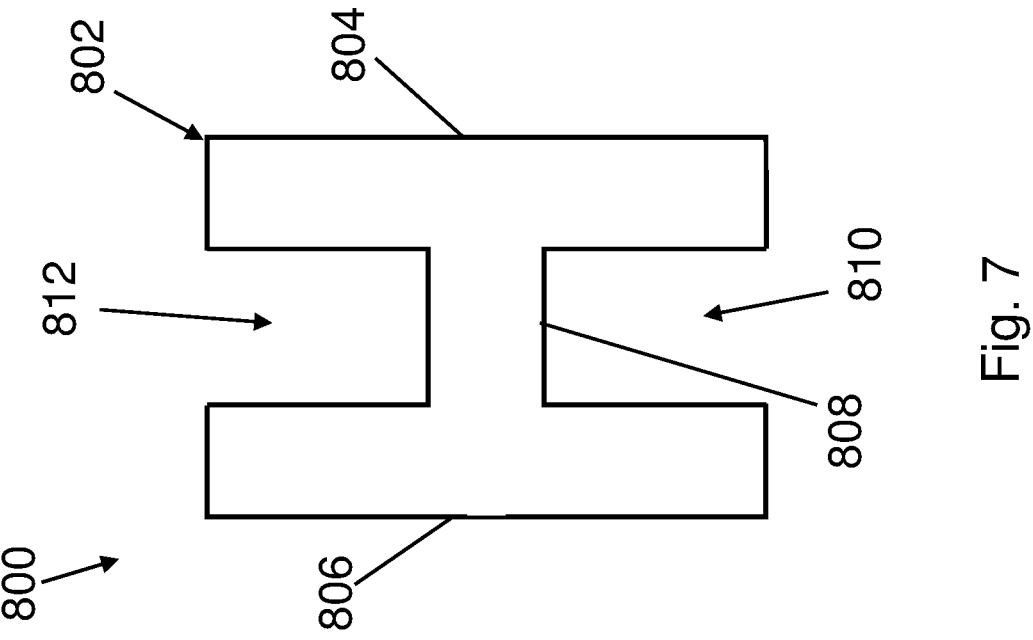
FIG. 7 is a schematic top view of a battery according to an embodiment of the invention.

FIGS. 7 and 8 illustrate different shapes of batteries according to embodiments of the invention. FIGS. 8 and 9 show schematic top views of batteries 800 and 900, respectively. Each of batteries 800 and 900 is designed to be used in an electric vehicle, and is shaped to fit around seats of the electric vehicle. In particular, each of batteries 800 and 900 may be used in an electric vehicle comprising a first seat and a second seat located behind the first seat.

The battery 800 comprises an outer housing 802, including a first side portion 804 which is configured to extend along a left-hand side of the first and second seats of the vehicle, a second side portion 806 which is configured to extend along a right-hand side of the first and second seats, and a connecting portion 808 which extends between ends of the first and second side portions 804, 806 to connect them together. The connecting portion 808 is disposed towards a middle of the first and second side portions 804, 808, and is configured to extend between the first seat and the second seat. The first side portion 804 and the second side portion 806 are approximately parallel, and spaced apart so as to define a spaces between them for the first and second seats of the vehicle. In particular, the first side portion 804 and the second side portion 806 may be spaced by a distance corresponding approximately to a width of the first and second seats of the vehicle. Thus, the housing 802 defines a front space 810 in front of the connecting portion 808 and between the first and second side portions 804, 806 in which the first seat may be located, and a back space 812 behind the connecting portion 808 and between the first and second side portions 804, 806 in which the second seat may be located. A first part of the battery 800 including a first plurality of battery cells is arranged within the first side portion 804 of the housing 802, a second part of the battery 800 including a second plurality of battery cells is arranged within the second side portion 806 of the housing 802, and an intermediate part of the battery 800 including a third plurality of battery cells is arranged within the connecting portion 808.

The battery 900 has a similar shape and arrangement to the battery 800 discussed above. For convenience, features of the battery 900 corresponding to those of battery 800 are labelled in FIG. 8 with the same reference numerals as in FIG. 7, and are not described again. In addition to the connecting portion 808, the housing 802 of the battery 900 further includes a rear connecting portion 902 which is connected between back ends of the first and second side portions 804, 806. The rear connecting portion 902 is configured to extend behind a back of the second seat. A rear intermediate part of the battery 900 including a fourth plurality of batteries is located within the rear connecting portion 902. Additionally or alternatively to the rear connecting portion 902, the housing 802 of the battery 900 may include a front connecting portion (not shown), which connects front ends of the first and second side portions 804, 806 and is arranged to be located towards a front of the first seat.

Figures 9A, 9B:
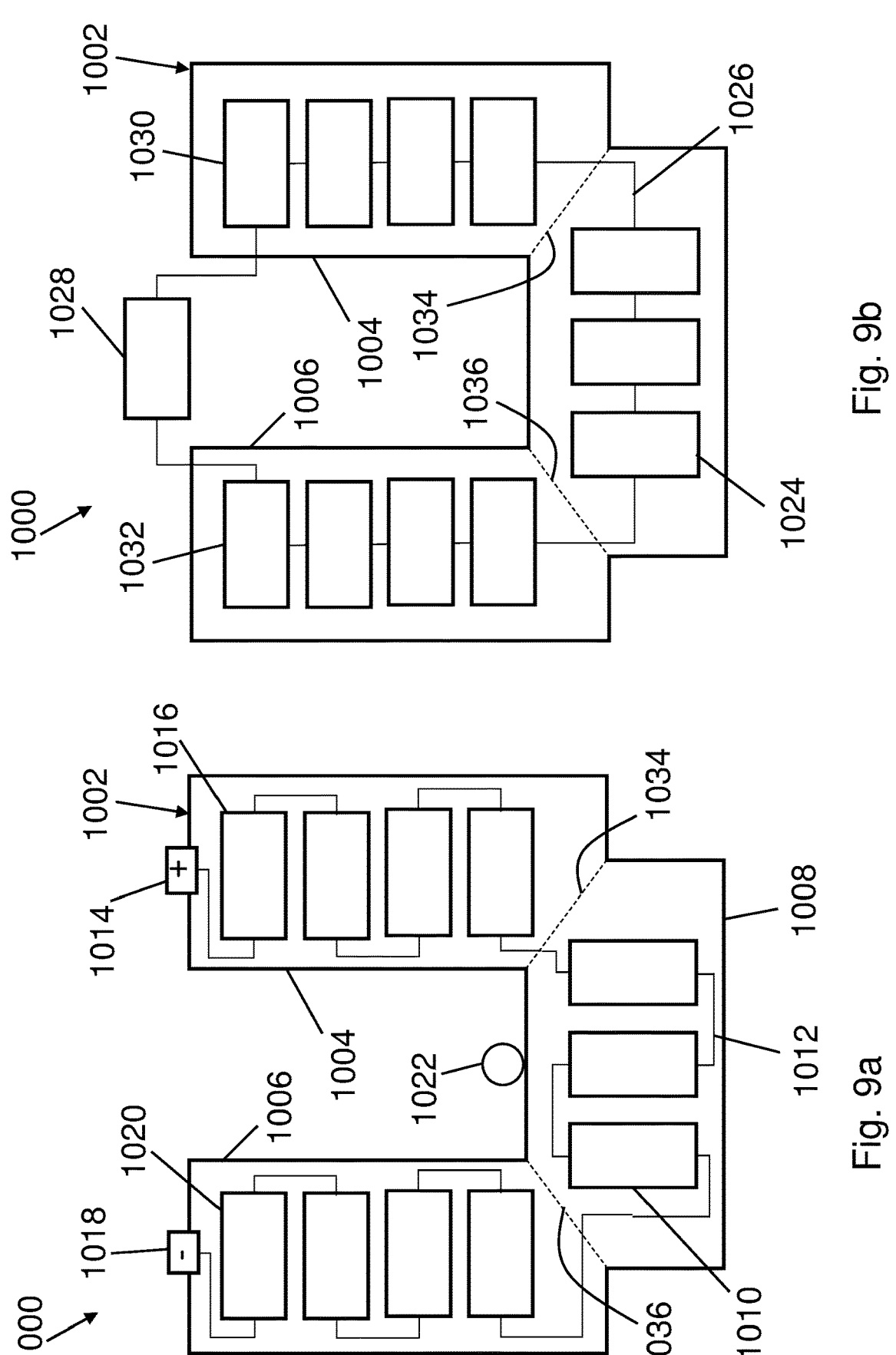
FIGS. 9a and 9b are schematic cross-sectional top views of a battery according to an embodiment of the invention.

FIGS. 9a and 9b illustrate details relating to an internal structure of a battery 1000 for an electric vehicle, the battery 1000 being an embodiment of the invention. FIGS. 9a and 9b show schematic cross-sectional top views of the battery, showing different aspects of the internal structure of the battery 1000. The battery 1000 includes a housing 1002 comprising a first side portion 1004 configured to extend along a first side of a seat of the vehicle, a second side portion 1006 configured to extend along a second, opposite side of the seat, and a connecting portion 1008 connected to first ends of the first and second side portions 1004, 1006 and extending between the first ends of the first and second side portions 1004, 1006. The battery 1000 may, for example, correspond to the battery 114 of vehicle 100 discussed above.

As shown in FIG. 9*a*, a plurality of battery modules 1010 is arranged within the housing 1002. Specifically, a first set of battery modules 1010 is disposed within the first side portion 1004 of the housing 1002, a second set of battery modules 1010 is disposed within the second side portion 1006 of the housing 1002, and a third set of battery modules 1010 is disposed within the connecting portion 1008 of the housing 1002. Each battery module 1010 comprises a plurality of battery cells that are electrically connected together. For instance, each battery module 1010 may include battery cells connected in series and/or battery cells connected in parallel, in order to provide a total voltage output and current output for the battery module 1010. Typically, the battery cells may be lithium-ion battery cells, although other types of rechargeable battery cells may also be used. The plurality of battery modules 1010 are electrically connected together. In the example shown in FIG. 9*a*, the plurality of battery modules 1010 are electrically connected in series via a set of electrical connectors (e.g. cables) 1012. In particular, each pair of adjacent battery modules 1010 is electrically connected in series via a respective electrical connector 1012. In other examples, the plurality of battery modules 1010 may be connected in parallel, or in any combination of series and parallel. For example, the first set of battery modules 1010 disposed within the first side portion 1004 of the housing 1002 may be connected together in series, and may be connected to the second set of battery modules 1010 disposed within the second side portion 1006 of the housing 1002 in parallel.

The housing 1002 may include a substantially flat base plate (not shown) on which the plurality of battery modules 1010 is mounted. The base plate may, for example, have a shape corresponding to the outline of the housing 1002 shown in FIGS. 9*a* and 9*b*. A cover may then be mounted over the battery modules 1010 and secured to the base plate (e.g. via any suitable fasteners), so that the battery modules 1010 are enclosed within the housing 1002. The base plate may, for example, be made of a composite material such as a carbon fibre material having a honeycomb or structural foam core, or of a reinforced steel plate. The cover may, for example, be made of a moulded plastic or composite material, or in some cases it may be made from a stamped metal sheet (e.g. aluminium or steel).

The battery 1000 includes a positive terminal 1014 disposed on a second end of the first side portion 1004 of the housing 1002, the second end being opposite to the first end of the first side portion 1004 to which the connecting portion 1008 is connected. The positive terminal 1014 is electrically connected to a positive terminal of a first battery module 1016 of the plurality of battery modules 1010. The first battery module 1016 is located in the first side portion 1004 towards the second end of the first side portion 1004, and is at an end of the series of battery modules 1010 (e.g. the first battery module 1016 may be the first battery module in the series).

The battery 1000 further includes a negative terminal 1018 disposed on a second end of the second side portion 1006 of the housing 1002, the second end being opposite the first end of the second side portion 1006 to which the connecting portion 1008 is connected. The negative terminal 1018 is electrically connected to a negative terminal of a second battery module 1020 of the plurality of battery modules 1010. The second battery module 1020 is located in the second side portion 1006 towards the second end of the second side portion 1006, and is at an end of the series of battery modules 1010 (e.g. the second battery module 1020 may be the last battery module in the series).

Thus, the positive terminal 1014 is connected to a positive end of the series-connected plurality of battery modules 1010, and the negative terminal 1018 is connected to a negative end of the series-connected plurality of battery modules 1010. In this manner, the positive and negative terminals 1014, 1018 can be connected to an electric motor of the vehicle (e.g. via suitable electrical components) in order to power the electric motor. As the positive and negative terminals 1014, 1018 are located on the second ends of the first and second side portions 1004, 1006, respectively, they may be disposed near the electric motor when the battery is mounted in the vehicle. This may facilitate connecting the battery 1000 to the electric motor, and avoid the need for a lengthy cable or busbar to bring the positive and negative terminals 1014, 1018 close together. For instance, where the battery 1000 is used as the battery 114 in the vehicle 100 discussed above, the positive and negative terminals 1014, 1018 would be located towards the back of the seat 104. This may facilitate connecting the positive and negative terminals 1014, 1018 to an electric motor of the vehicle 100, e.g. where the vehicle 100 is a rear-wheel drive vehicle having an electric motor disposed towards a rear of the vehicle 100, e.g. behind the seat 104. On the other hand, in a case of a vehicle having an electric motor disposed in a front of the vehicle, the battery 1000 may be arranged such that the connecting portion 1008 is located behind a seat of the vehicle, such that the positive and negative terminals 1014, 1018 are located towards the front of the vehicle.

The battery 1000 further comprises a manual service disconnect (MSD) switch 1022, which is located next to the connecting portion 1008 of the housing 1002. The MSD switch 1022 is configured to disconnect the plurality of battery modules 1010 from the positive terminal 1014 when it is activated by a user. Locating the MSD switch 1022 next to the connecting portion 1008 may facilitate access to the MSD switch 1022 by an occupant of the vehicle. For example, where the battery 1000 is used as the battery 114 in the vehicle 100 discussed above, MSD switch 1022 may be located under the seat 104 or in front of the seat 104, such that an occupant of the seat 104 may activate the MSD switch 1022 without leaving the seat 104. In practice, the MSD switch 1022 may be arranged behind a releasable panel so that it is concealed during normal use of the vehicle. In other examples, where the connecting portion 1008 is configured to be located behind the back of the seat of the vehicle, the MSD switch 1022 may instead be located between the second ends of the first and second side portions 1004, 1006, so that the MSD switch 1022 may be arranged under or in front of the seat.

FIG. 9*b* shows a plurality of module monitoring units 1024 in the housing 1002 for monitoring a status of the plurality of battery modules 1010. In the example shown, each module monitoring unit 1024 is associated with a respective one of the battery modules 1010. Each module monitoring unit 1024 may be mounted on or adjacent to its associated battery module 1010. In other examples, a module monitoring unit 1024 may be associated with multiple battery modules 1010, rather than just a single battery module 1010. Each module monitoring unit 1024 is configured to detect status information concerning its associated battery module 1010. For example, each module monitoring unit 1024 may be configured to detect a temperature of its associated battery module 1010 (e.g. via a corresponding temperature sensor in the battery module), as well as a charge state and/or output voltage of the battery module 1010.

The plurality of module monitoring units 1024 are connected together in series, to enable data to be transmitted between the module monitoring units 1024. In particular, each pair of adjacent module monitoring units 1024 is connected together via a respective connector 1026 (e.g. cable), such that data can be transmitted between the adjacent module monitoring units 1024. Thus, data may be transmitted from one battery controller 1024 to the next along the series. Furthermore, the battery 1000 includes a battery control unit 1028, which is configured to communicate with each of the module monitoring units 1024 and receive data indicative of the status information detected by each of the module monitoring units 1024. The battery control unit 1028 may be implemented using any suitable computing device having corresponding control software installed thereon. The battery control unit 1028 is connected to a first module monitoring unit 1030 of the plurality of battery module monitoring units 1024 via a suitable connector (e.g. cable). The first module monitoring unit 1030 is located in the first side portion 1004 towards the second end of the first side portion 1004, and is at an end of the series of module monitoring units 1024 (e.g. the first module monitoring unit 1030 may be the first module monitoring unit in the series). The battery control unit 1024 is further connected to a second module monitoring unit 1032 of the plurality of module monitoring units 1024, via a suitable connector (e.g. cable). The second module monitoring unit 1032 is located in the second side portion 1006 towards the second end of the second side portion 1006, and is at an end of the series of module monitoring units 1024 (e.g. the second module monitoring unit 1032 may be the last module monitoring unit in the series).

Thus, the battery control unit 1028 is connected to the first and last module monitoring units in the plurality of series-connected module monitoring units 1024. The shape of the battery 1000 facilitates connecting the battery control unit 1028 in this manner, as it brings the first and last module monitoring units in the plurality of series-connected module monitoring units 1024 close together. In particular, the battery control unit 1028 is located between the second ends of the first and second side portions 1004, 1006 of the housing 1002, such that the first module monitoring unit 1030 and the second module monitoring unit 1032 are located on opposite sides of the battery control unit.

The battery control unit 1028 may communicate with each of the module monitoring units 1024, by transmitting and receiving signals along the series of module monitoring units 1024. In this manner, the battery control unit 1028 may not need to be directly connected to each of the module monitoring units 1024. Moreover, as the battery control unit 1028 is connected to each end of the series of module monitoring units 1024, the battery control unit 1028 may still be able to communicate with each of the module monitoring units 1024, even if there is a broken connection between a pair of adjacent module monitoring units 1024. Each module monitoring unit 1024 may have a respective identifier (e.g. an address) which is used by the control unit 1028 to communicate with that module monitoring unit 1024, in order to ensure that the battery control unit 1028 can communicate with a desired module monitoring unit 1024. The battery control unit 1028 may receive a signal from each module monitoring unit 1024 that is indicative of the status information detected by each module monitoring unit 1024 regarding its associated battery module 1010. Thus, the battery control unit 1028 enables centralised monitoring of the battery 1000.

The battery control unit 1028 may further be configured to control charging of the plurality of battery modules 1010. In particular, the battery control unit 1028 may be configured to control a charging voltage and/or charging current supplied to the battery modules 1010, in order to charge the battery cells in each of the battery modules. The battery control unit 1028 may be configured to control charging of the battery modules 1010 based on the data received from the module monitoring units. For instance, the battery control unit 1028 may ensure that the temperature of the battery modules 1010 does not exceed a threshold temperature during charging. The battery control unit 1028 may be configured to adjust one or more charging parameters (e.g. a charging voltage and/or charging current supplied to the battery modules 1010) based on the data received from the module monitoring units.

As shown in FIGS. 9a and 9b, the inside of the housing 1002 is divided into compartments. In particular, a first barrier 1034 is located at an interface between the first side portion 1004 and the connecting portion 1008, and a second barrier 1036 is located at an interface between the second side portion 1004 and the connecting portion 1008. The first and second barrier 1034, 1036 are arranged to restrict propagation of fire between the different portions of the housing 1002, e.g. in case of a malfunction of battery components located in one or the portions. The first and second barriers 1034, 1036 may comprise a fire retardant material, in order to minimise the risk of fire propagation from one portion of the housing 1002 to another.

The first and second barriers 1034, 1036 may include passageways formed therein, through which the electrical connectors 1012 and connectors 1026 may pass, to enable connection between the battery modules 1010 and module monitoring units 1024 located in the different portions of the housing 1002. Alternatively, the housing 1002 may include passageways formed therein for routing the electrical connectors 1012 and connectors 1026 around the first and second barriers 1034, 1036.

One or more flow paths (not shown) may be defined within the housing 1002, so that a coolant can be flowed through the one or more flow paths in order to remove heat from, and/or provide heat to, the battery 1000 and maintain the battery 1000 at a suitable working temperature. In particular, the battery 1000 may further comprise a thermal conditioning system which is arranged to circulate a coolant through the one or more flow paths in the housing 1002 to remove heat from, and/or provide heat to, the housing 1002. The thermal conditioning system may include a coolant source, configured to flow coolant along the one or more flow paths, as well as a heat exchanger for removing heat from the coolant after it has been flowed along the one or more flow paths in the housing 1002 (e.g. so that the coolant can then be recirculated along the one or more flow paths). The thermal conditioning system may further include a heater for providing heat to the coolant before it is flowed along the one or more flow paths in the housing 1002. In one embodiment, the one or more flow paths may comprise a single flow path which extends through at least part of the first side portion 1004, the connecting portion 1008 and the second side portion 1006. In this manner, the same flow path may be used for conditioning the different portions of the housing 1002, which may simplify connection to the coolant source. For example, an inlet of the flow path may be provided at the second end of the first side portion 1004, and an outlet of the flow path may be provided at the second end of the second side portion 1006. As a result, the inlet and the outlet may be located close together, which may facilitate connecting the inlet and outlet to the thermal conditioning system. Additionally or alternatively, there may be multiple flow paths formed within the housing 1002, e.g. with each of the multiple flow paths arranged to condition a different portion of the housing. In such a case, there may be multiple inlets and outlets provided around the housing 1002.

The invention claimed is:

1. An electric vehicle comprising:
   a cockpit containing a first seat, the first seat having a seating surface adapted to receive an occupant of the vehicle; and
   a battery comprising a housing, the housing comprising:
      a first side portion extending along a first side of the first seat, wherein a first side part of said battery is disposed in said first side portion;
      a second side portion extending along a second side of the first seat, the second side being on an opposite side of the first set from the first side, wherein a second side part of said battery being disposed in said second side portion;
      a connecting portion that connects the first side portion and said second side portion, wherein an intermediate part of said battery is positioned in said connecting portion, wherein each of the first side part and the second side part and the intermediate part comprises a plurality of battery cells, wherein at least a portion of the seating surface is lower than an uppermost surface of said battery.

2. The electric vehicle of claim 1, wherein a height of the intermediate part is less than a height of the first side part and the second side part.

3. The electric vehicle of claim 2, wherein the height of the intermediate part is less than 70% of the height of the first side part and the second side part.

4. The electric vehicle of claim 1, wherein the intermediate part has a front intermediate part disposed towards a front of the first seat.

5. The electric vehicle of claim 4, wherein the front intermediate part is located under a front portion of the seating surface of the first seat.

6. The electric vehicle of claim 4, wherein the front intermediate part is located under a floor of said cockpit.

7. The electric vehicle of claim 1, wherein the intermediate part comprises a back intermediate part positioned behind a back of the first seat.

8. The electric vehicle of claim 7, wherein said cockpit contains a second seat positioned behind the first seat, and wherein the back intermediate part is located between the first seat and the second seat.

9. The electric vehicle of claim 8, wherein the intermediate part has a rear intermediate part disposed behind a back of the second seat.

10. The electric vehicle of claim 8, wherein the first side part extends along the first side of the first seat and a first side of the second seat, and the second side part extends along the second side of the first seat and a second side of the second seat, the second side of the second seat being opposite to the first side of the second seat.

11. The electric vehicle of claim 1, wherein the intermediate part comprises a protruding part that extends in a longitudinal direction away from the first seat.

12. The electric vehicle of claim 1, wherein the uppermost surface of the battery is higher than an H-point of the first seat.

13. The electric vehicle of claim 1, wherein a width of the first side part increases away from the intermediate part, a width of the second side part increasing away from the intermediate part.

14. The electric vehicle of claim 1, wherein the battery further comprises:
   a first barrier located between the first side portion and the connecting portion, wherein the first barrier is configured to restrict fire propagation between the first side portion and the connecting portion; and
   a second barrier located between the second side portion and the connecting portion, wherein the second barrier is configured to restrict fire propagation between the second side portion and the connecting portion.

15. The electric vehicle of claim 1, wherein at least one flow path for a coolant is defined within the housing such that the at least one flow path extends through at least a portion of the first side portion and the connecting portion and the second side portion.

16. The electric vehicle of claim 1, wherein a first terminal of said battery is located at the first side part, and wherein a second terminal of said battery is located at the second side part.

17. The electric vehicle of claim 16, wherein the first terminal is located at an end region of the first side portion and the second terminal is located at an end region of the second side portion, wherein the end region of the first side portion is located at an end of the first side portion that is opposite to an end of the first side portion which is connected to the connecting portion, and wherein the end region of the second side portion is located at an end of the second side portion that is opposite to an end of the second side portion which is connected to the connecting portion.

18. The electric vehicle of claim 1, wherein said battery further comprises:
   a plurality of battery modules disposed in each of the first side part and the second side part and the intermediate part, each battery module of said plurality of battery modules comprising a respective subset of battery cells;
   a plurality of module monitoring units disposed in each of the first side part and the second side part and the intermediate part and arranged to control said plurality of battery modules; and
   a battery control unit being connected to at least a first one of said plurality of module monitoring units that is disposed in the first side part and a second one of said plurality of module monitoring units that is disposed in the second side part.

19. The electric vehicle of claim 18, wherein the battery control unit is located between the first side part and the second side part.

20. The electric vehicle of claim 1, wherein the first side part comprises a first side impact absorbing structure, and the second side part comprises a second side impact absorbing structure.

21. The electric vehicle of claim 1, wherein a first side wall of said cockpit is disposed between the first seat and the first side part, and a second side wall of said cockpit is disposed between the first seat and the second side part.

22. The electric vehicle of claim 21, wherein:
   the vehicle comprises an external body, said cockpit being disposed inside the external body;
   the first side part being disposed within a first compartment defined between the first side wall and the external body; and the second side part being disposed within a second compartment defined between the second side wall and the external body.

23. The electric vehicle of claim 1, wherein:

the vehicle comprises an external body, said cockpit being disposed inside the external body;

the first side part being disposed in a first compartment defined on an outside of the external body; and the second side part being disposed in a second compartment defined on the outside of the external body.

24. A battery for an electric vehicle, the battery comprising:

a housing comprising a first side portion configured to extend along a first side of a first seat of the vehicle, a second side portion configured to extend along a second side of the first seat, and a connecting portion that connects the first and second side portions, the second side being opposite to the first side; and a plurality of battery cells disposed in the housing and arranged in each of the first side portion and the second side portion and the connecting portion of the housing.

* * * * *